Jan. 26, 1965  B. R. HEPBURN  3,166,812
PIPE COUPLING

Filed May 28, 1962  2 Sheets-Sheet 1

FIG. I

INVENTOR
BERNARD R. HEPBURN
BY: Maybee & Legris
ATTORNEYS

Jan. 26, 1965   B. R. HEPBURN   3,166,812
PIPE COUPLING

Filed May 28, 1962   2 Sheets-Sheet 2

INVENTOR
BERNARD R. HEPBURN
BY: *Maybee & Legris*
ATTORNEYS 3,166,812
PIPE COUPLING
Bernard Rickart Hepburn, Oakville, Ontario, Canada, assignor to National Sewer Pipe Limited, Oakville, Ontario, Canada, a corporation
Filed May 28, 1962, Ser. No. 198,260
1 Claim. (Cl. 24—279)

This invention relates to pipe couplings and particularly to clamping means for plain end pipe couplings.

The object of the invention is to devise a simple clamping means which can be quickly and easily tightened and yet will not be tightened sufficiently to break or weaken the coupling.

The object has been achieved by interposing between the clamping head and the tightening means, means bendable under strain to indicate when sufficient tightening force has been applied to the band.

The construction of the coupling is substantially the same as shown in United States Patents 2,846,243 and 2,893,760, that is to say, it is a continuous belt of rubber or the like having a hollow annular raised ridge adjacent each side thereof forming channels through each of which extends a metal band. This is placed over ends of adjacent pipes.

The invention is illustrated by way of example in the accompanying drawings in which:

FIGURES 2–6 are on a larger scale than FIGURE 1.

Figure 1:
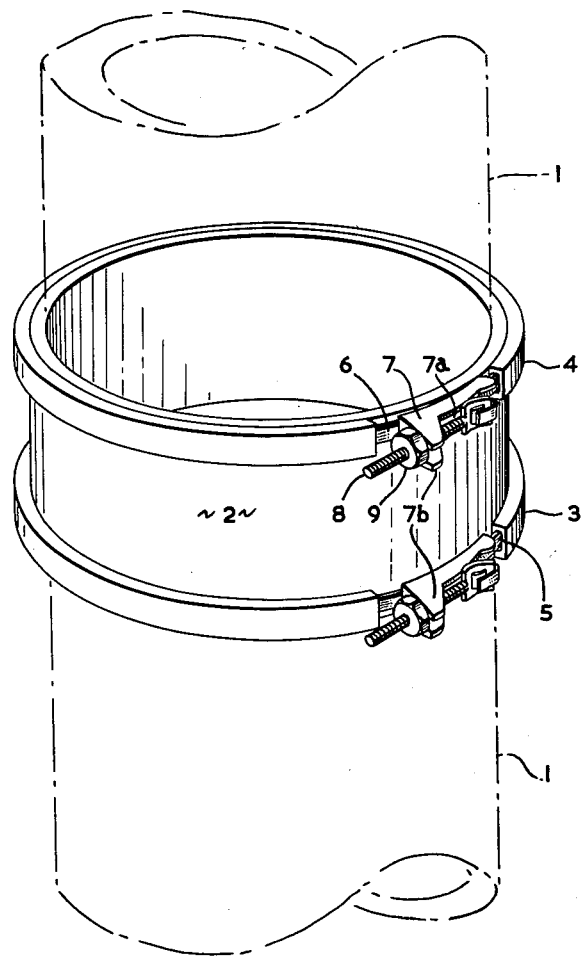
FIGURE 1 is a perspective view of the coupling.

Referring to the drawings, the pipes to be connected are designated in FIGURE 1 by the reference numeral 1, and the belt 2 of rubber or the like is provided with hollow ridges 3 and 4 through which pass silicon bronze bands 5 and 6, fitting losely therein, to provide slack in the bands prior to tightening the coupling. Since the construction of each of the ridges 3 and 4 is the same, I will describe the connecting and clamping means associated with the ridge 4 and the band 6.

*Means for connecting and tightening bands*

Figure 4:
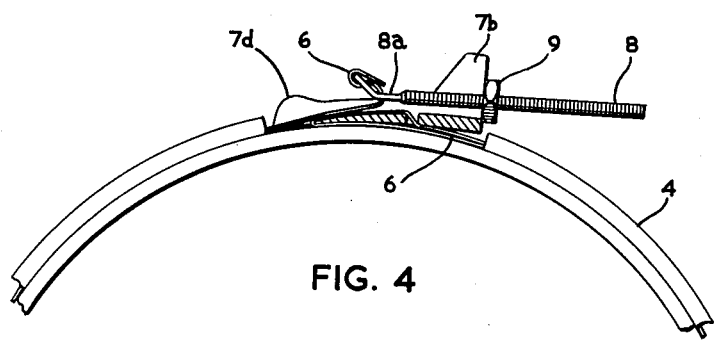
FIGURE 4 is a side elevation showing the connecting means when tightened.
Figure 6:
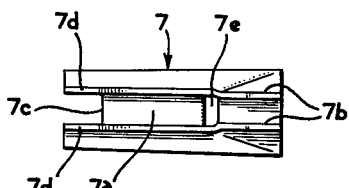
FIGURE 6 is a plan view of the bracket.
Figure 5:
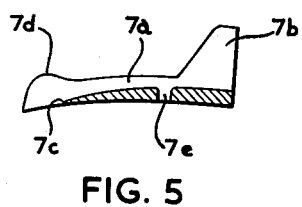
FIGURE 5 is a longitudinal section of the bracket.

A bracket 7 formed of silicon bronze is elongated in form and provided with a longitudinal recess 7a in its upper surface (see FIGURE 6), spaced apart upwardly extending lugs 7b, 7b, at one end, a transverse recess 7c in its other end, and upwardly extending guiding lugs 7d, 7d. One end of the band 6 extends as shown in FIGURES 4 and 5 upwardly through a slot 7e in the underside of the longitudinal recess 7a, along the bottom of the longitudinal recess 7a to the other end of the bracket, around the end of the bracket in the recess 7c and back beneath the bracket to a point about ½ inch within the ridge 4. By this arrangement the band 6 is in engagement with the belt 2 throughout substantially the whole length of the bracket 7. The base of the bracket 7 is curved to substantially the same curvature as the belt 2.

Figure 2:
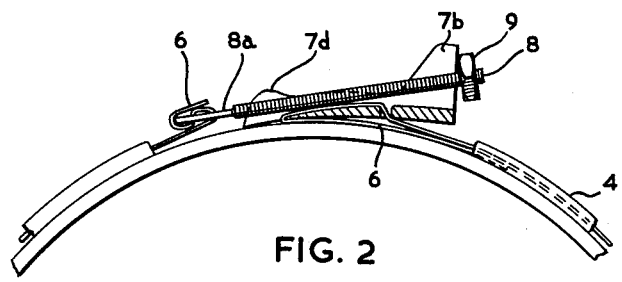
FIGURE 2 is a side elevation showing the connecting means before tightening.
Figure 3:
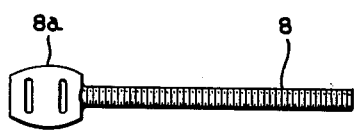
FIGURE 3 is a plan view of the tightening bolt.

The other end of the band 6 is secured to a bolt 8 as illustrated in FIGURE 2 and FIGURE 3. The flattened end or head 8a of the bolt has two paralel transverse slots in it and the band 6 extends under the head 8a up through the inner slot, over the head, down through the outer slot and around the outer end of the bolt head and back over the head, as shown in FIGURE 2.

The bolt 8 is adapted to lie in the recess 7a of the bracket 7 on top of the band 6 and to extend between the lugs 7b, 7b and 7d, 7d. Nut 9 may be tightened on the end of the bolt 8, pulling the ends of the band 6 together and thus compressing the belt 2 into close contact with the pipe 1.

*Means to indicate when sufficient tightening force applied*

As tightening force is applied, the flat end 8a of the bolt 8 will be bent up as shown in FIGURE 4, thus preventing stripping of the bolts' threads and indicating to the user that sufficient pressure has been applied as shown in FIGURE 4.

The arrangement is such that when the clamping device is tightened the bolt head 8a rides over the top of lugs 7d, 7d, drawing the end of the band 6 over the lugs so that the band is drawn into the recess 7a. The clamping device is arranged so that the required tightening force to seal the pipe will be obtained before the bolt head 8a makes contact with the upwardly extending lugs 7b, 7b.

The bolt end 8a will commence to bend up as stress increases on the band and when maximum desired pressure is applied it will be approaching a position of about 45° indicating that further tightening of the coupling is unnecessary and might result in breakage of the bolt end.

When the coupling is tightened to the desired extent the band 6 rides up over the other end of the band in transverse recess 7c and the sealing at this point is effected by the base of the guiding lugs 7d, 7d pressing against the resilient belt 2.

It will be noted that the band 6 with the underside of the lugs 7d, 7d provide a continuous pressure on the belt 2 between the ends of the ridges, thus creating a continuous seal between the belt and the pipe.

It will be understood that, as stated above, although the construction and operation of the tightening band 6 has been described, the construction and operation of band 5 is similar.

What I claim as my invention is:

Clamping means for a pipe coupling comprising a band adapted to encircle the coupling, a connector including a bracket connected to one end of the band and a threaded bolt connected to the other end of the band, said bracket having a recess therein adapted to receive the bolt, and a nut for the bolt adapted to engage the bracket and tighten the band when the nut is rotated on the bolt, said bolt having a head adapted to bend under a predetermined pressure and provided with inner and outer parallel transverse slots, the band extending under the head, up through the inner slots, over the head, down through the outer slot, around the outer end of the head and back over the head, so that the head will deform in a predetermined manner without breaking to indicate when sufficient tightening force has been applied to the band.

References Cited by the Examiner
UNITED STATES PATENTS

| | | | |
|---|---|---|---|
| 1,309,476 | 7/19 | Hill | 24—280 |
| 1,816,197 | 7/31 | Ruemelin | 24—279 |
| 2,482,374 | 9/49 | Ruschmeyer | 24—280 X |
| 2,846,243 | 8/58 | Jewell | 24—278 X |
| 2,893,760 | 7/59 | Jewell | 24—278 X |
| 2,956,325 | 10/60 | Browne | 24—271 |

FOREIGN PATENTS

| | | |
|---|---|---|
| 151,185 | 9/20 | Great Britain. |
| 212,591 | 5/56 | Australia. |

M. HENSON WOOD, Jr., *Primary Examiner.*
ABRAHAM G. STONE, *Examiner.*